H. W. PLEISTER.
EXPANSION BOLT ANCHOR.
APPLICATION FILED JAN. 16, 1908.

950,492.

Patented Mar. 1, 1910.

Witnesses
H. Crockeron
Geo. Pülschen

Henry W. Pleister
Inventor
By his Attorney Alan M. Johnson

UNITED STATES PATENT OFFICE.

HENRY W. PLEISTER, OF WESTFIELD, NEW JERSEY, ASSIGNOR TO HENRY B. NEWHALL, OF PLAINFIELD, NEW JERSEY.

EXPANSION BOLT-ANCHOR.

950,492.  Specification of Letters Patent.  Patented Mar. 1, 1910.

Application filed January 16, 1908. Serial No. 411,140.

*To all whom it may concern:*

Be it known that I, HENRY W. PLEISTER, a citizen of the United States, and a resident of Westfield, in the county of Union and State of New Jersey, have invented certain new and useful Improvements in Expansion Bolt-Anchors, (Case B,) of which the following is a specification, taken in connection with the accompanying drawings, which form a part of the same.

This invention relates to expansion bolt anchors and more particularly to increasing the effective length of comparatively short expansible members of an anchor by forming the bolt anchor with an adjustable non-expansible member to permit the expansible and non-expansible parts of the bolt anchor to be adjusted with relation to each other, which will permit a comparatively long lag screw, bolt or other expanding means to be used with a comparatively short expansible member.

Figure 1:
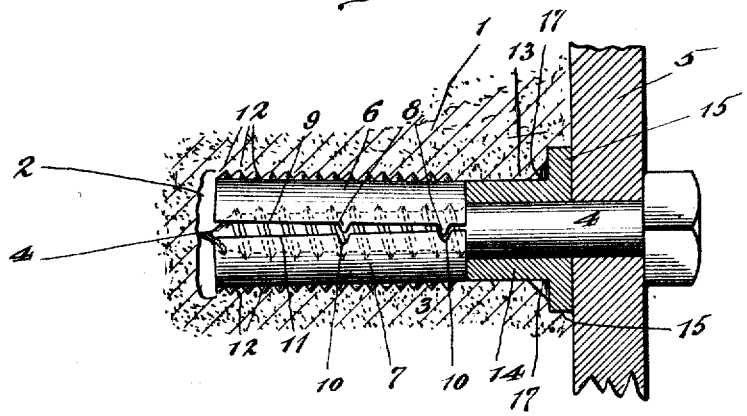
Figure 2:
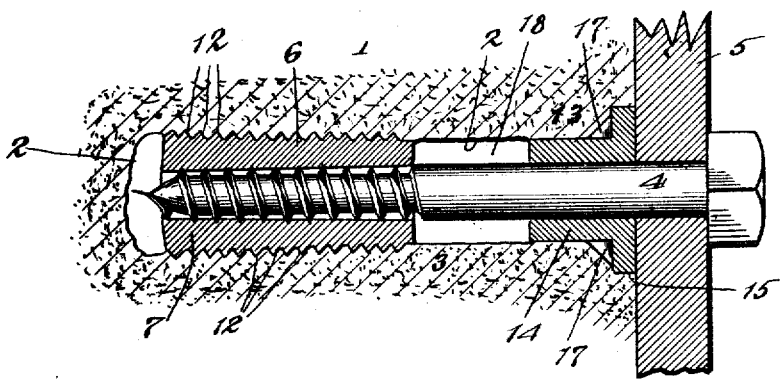
Figure 3:
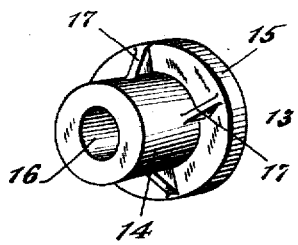

In the accompanying drawings showing an illustrative embodiment of this invention and in which the same reference numeral refers to similar parts in the several figures, Figure 1 is a longitudinal vertical section showing my bolt anchor in operative position, the parts of the shield for purposes of illustration being shown at an exaggerated angle to each other, and in side elevation as is the lag screw. Fig. 2 is a longitudinal vertical section similar to Fig. 1 but showing the bolt anchor used with a longer lag screw and in a deeper hole in the masonry, brick or other suitable support, the lag screw being shown in side elevation. Fig. 3 is a perspective view of the separate sleeve or thimble of the bolt anchor.

In the illustrative embodiment of this invention shown in the drawings 1 is a support of masonry, brick, cement or any other material in which a hole 2 has been drilled, bored or otherwise made, for the reception of the bolt anchor 3 and lag screw 4 used to secure a supported member 5 to the masonry or other support 1.

The bolt anchor may be formed of a member comprising a plurality of expansible sections, two sections 6 and 7 being shown for purposes of illustration, and a non-expansible part, though it is to be understood that this number may be multiplied without departing from my invention. Upon one of the expansible sections, for instance 6, I form preferably on each of its meeting faces 9, 9, though this is not material, one or more protuberances or projections, 8, 8 which register with complementary sockets 10, 10, upon the coöperating faces 11, 11, of the section 7. These projections and sockets are very effective in preventing relative movement of the members 6 and 7 before the expansible members are placed in the hole 2, and also prevents relative movement of these two parts 6 and 7 when the lag screw or machine bolt forces them apart, as shown for instance in Fig. 1.

The exterior surface of the shields 6 and 7 may be formed with serrations or teeth 12, 12, to increase the friction of the shields when expanded in the hole 2; these serrations or teeth 12, 12, may however be omitted leaving the exterior surface smooth. The interior of the shields 6 and 7 may be screw-threaded to coöperate with the threads of either a lag screw or a machine screw, for it is to be understood that either form of screw threads may be used upon the expanding means. Instead of forming screw threads upon the interior of the members 6 and 7 they may be left plain, the threads being formed upon them by the male threads of either the screw threads of the lag screw or the machine screw upon the expanding means.

With the bolt anchors now in use it is found necessary to carry quite an assortment of different lengths of bolt anchors to fit different depths of holes 2 and different lengths of lag screws or machine bolts, whichever are used with the bolt anchor. If the length of the bolt anchor be for instance, too great to snugly fit within the hole 2 the supported member 5 would not be held snugly against the support 1 and would present an unworkmanlike appearance and one which would not be tolerated in practice. If on the other hand the length of the bolt anchor is not sufficient to fill the hole 2, and it is necessary to use a longer lag screw or machine bolt with it than the length ordinarily used, the headed end of the bolt or lag screw is left unsupported with the weight 5 upon it and with a leverage which in practice serves to either break or bend the bolt or lag screw, permitting the supported member 5 to become entirely detached from the support 1 or, if the bolt merely bends, to be thrown out of plumb.

Where the support 1 is brick work it is often found in practice necessary, to get a firm support, to carry the depth of the hole 2 back into the second course of bricks, and place practically all of the expanding force of the bolt anchor upon that inner course of bricks rather than upon the front or face of the wall. In such cases it is necessary to use a comparatively short bolt anchor with a comparatively long lag screw or machine bolt. The effect in such cases is that only that portion of the lag screw or machine bolt within the bolt anchor is supported, the other portion, upon which is mounted the supported member 5, being liable to break or bend as previously pointed out.

The necessity of using shorter expansible members than the depth of the hole is also imperative where it is necessary to go through a soft or frangible body, such as plaster or enamel brick, or similar materials, to get to the backing of firmer substance. If the expanding strain of the ordinary bolt anchor was transmitted to such surfaces they would crumble or be chipped or otherwise marred and damaged. To prevent such damage and to permit in practice a great range or usefulness for comparatively short expanding sections, with a comparatively long lag screw or machine bolt, without damage or injury to the screw or bolt, I use a bolt anchor having a member comprising expansible sections and a separate non-expansible member relatively movable to the member comprising the expansible sections. The non-expansible member consists of a hollow cylindrical body portion 14 and preferably, though not necessarily, an annular flange 15. The interior bore 16 should be of just sufficient diameter to snugly fit the lag screw or machine bolt which passes through it; the diameter of the cylindrical body portion 14 is such as to fit the hole 2, Figs. 1 and 2. In use, after the expansible members 6 and 7 of the bolt anchor have been placed in the hole 2 a sufficient depth to accommodate the particular length of lag screw or machine bolt to be used, I force the non-expansible member or thimble 13 of the bolt anchor into the mouth of the hole 2 and then pass the lag screw 4 through it into the expansible members 6 and 7, Fig. 1. By the use of my bolt anchor having the non-expansible member or thimble the bending or torsional strain upon the end of the bolt is transmitted to the masonry or other support, for the entire length of the bolt, within the hole 2, is supported at all points, Fig. 1.

In those cases where the hole 2 is of greater depth than the combined length of the expansible sections 6 and 7 and the thimble 13, I arrange my bolt anchor so that the expansible members are placed at the proper depth in the hole to coöperate with the particular length of lag screw or bolt to be used, and the non-expansible member or thimble 13 is preferably located at the mouth of the hole with its outer surface flush with the surface of the support 1, Fig. 2. The flange 15, where one is used, serves to limit the inward movement of the thimble 13 and also protects the surface of the support at this point. The mouth of the hole 2 may be enlarged, in any suitable manner for the reception of the annular flange 15 or the flange can be forced into the support 1, if formed of material which will permit it. To prevent the non-expansible member or thimble 13 from turning in the hole 2, I form one or more ribs 17, 17, on its outer surface and, when an annular flange is used, preferably connect these ribs to the flange, though this is not essential.

In the arrangement shown in Fig. 2 there is a space 18 between the expansible members and the non-expansible member or thimble. This of course in use may be increased or decreased. By the use of my invention I am also enabled to make short expansible members do the work of larger expansible members with the accompanying saving in cost of manufacture and shipping.

Having thus described this invention in connection with an illustrative embodiment thereof, to the details of which I do not desire to be limited, what is claimed as new and what it is desired to secure by Letters Patent is set forth in the appended claims.

1. The combination with a bolt anchor having a non-expansible member and a separate expansible member adjustable toward and away from said non-expansible member, said non-expansible member having at least a portion thereof of substantially uniform diameter which is substantially the same as that of the proximate end of the expansible member, of a bolt passing through said non-expansible member and adapted to expand said expansible member.

2. The combination with an anchor having a non-expansible member and a separate expansible member adjustable toward and away from said non-expansible member, said non-expansible member having at least a portion thereof of substantially uniform diameter which is substantially the same as that of the proximate end of the expansible member, of expanding means passing through said non-expansible member and adapted to expand said expansible member.

HENRY W. PLEISTER.

Witnesses:
MARGERY ADAMSON,
ALAN M. JOHNSON.